United States Patent [19]

Porel

[11] Patent Number: 4,603,711

[45] Date of Patent: Aug. 5, 1986

[54] PRESTRESSED HYDRAULIC ACCUMULATOR

[75] Inventor: Louis C. Porel, Rambervillers Jeanmenil, France

[73] Assignee: Hydro Rene Leduc, France

[21] Appl. No.: 661,663

[22] Filed: Oct. 18, 1984

Related U.S. Application Data

[63] Continuation-in-part of Ser. No. 236,195, Feb. 20, 1981, Pat. No. 4,492,013.

[30] Foreign Application Priority Data

| | | | |
|---|---|---|---|
| Feb. 27, 1980 | [FR] | France | 80 04313 |
| Apr. 30, 1980 | [FR] | France | 80 09781 |

[51] Int. Cl.[4] .......... F16L 55/04

[52] U.S. Cl. .......... 138/30; 220/85 B

[58] Field of Search .......... 138/26, 30; 29/157 R, 29/446; 92/98 R, 128; 285/381; 403/273, 300; 220/85 B

[56] References Cited

U.S. PATENT DOCUMENTS

| | | | |
|---|---|---|---|
| 2,563,257 | 8/1951 | Loukonen | 138/30 |
| 2,667,184 | 1/1954 | Hailer et al. | 92/98 R |
| 2,751,934 | 6/1956 | Saunders | 92/98 R |
| 3,524,665 | 8/1970 | Hohn et al. | 403/273 |
| 3,825,034 | 7/1974 | Chousings | 138/30 |

FOREIGN PATENT DOCUMENTS

| | | | |
|---|---|---|---|
| 1577284 | 10/1980 | United Kingdom | 138/30 |

*Primary Examiner*—James E. Bryant, III

*Attorney, Agent, or Firm*—Darby & Darby

[57] ABSTRACT

A hydraulic accumulator comprises two-half shells, the diaphragm therebetween defining two cavities. One cavity contains pressurized gas and the cavity receives hydraulic fluid under pressure. The two-half shells are held together by a mechanical element, such as a belt which has been previously prestressed to a tension selected according to the maximum pressure to which the accumulator will be subjected. The use of the prestressed mechanical element changes the dynamic stresses ordinarily found in a hydraulic accumulator to static stresses, thus minimizing the occurrence of creeks and failure of the device.

14 Claims, 6 Drawing Figures

PRESTRESSED HYDRAULIC ACCUMULATOR

FIELD OF THE INVENTION

This is a continuation-in-part, of application Ser. No. 236,195 filed Feb. 20, 1981 now U.S. Pat. No. 4,492,013. The present invention relates to an oleo-pneumatic accumulator Generally, the enclosure is a metallic casing. The separator may be made of a flexible membrane.

Experience proves that accumulators, when they operate at a high pressure and at frequently repeated pressurization and depressurization cycles, quickly deteriorate due to metal fatigue. In the case of enclosures made of two portions screwed one into the other, it is at the bottom of the screw threads where the fatigue starts to appear. It is characterized by creeks which cause the breaking of the enclosure.

OBJECTS AND SUMMARY OF THE INVENTION

The object of the present invention is to transform the dynamic stresses to which the junction of the two enclosures is subjected, thereby causing metal fatigue, into a static stress, thereby removing the metal fatigue.

The invention relates to a manufacturing process of an oleo-pneumatic accumulator made of two shells assembled to each other, after the interposition of a flexible separating membrane, said process being characterized in that the mechanical element providing the connection between the two shells is subjected, before the assembly, to a prestress.

According to a first embodiment. the two shells are assembled to each other by means of an outer belt, previously set under tension; according to a second embodiment, the two shells are each provided with a skirt, one of them fitting into the other, and one of the skirts having been previously set under tension.

According to the present invention, and in one or the other of the hereabove embodiments, a cylindrical wedge can be interposed between the two shells so that, when the effort to which the accumulator is subjected is superior to that of the prestress, the shells draw apart, at least slightly, from the wedge, thereby causing a leakage flow.

Thus, this arrangement plays the part of an overpressure valve which provides a security preventing the accumulator from being subjected to a maximum predetermined pressure.

By providing one or several liquid discharge openings through the prestressed belt, the oil is allowed to be discharged, thereby making the leakage flow caused by an overpressure more visible.

The invention relates also to means for performing the process and also, as novel industrial products, accumulators to which the process has been applied.

BRIEF DESCRIPTION OF THE DRAWINGS

By way of a non limiting example and in order that the invention may become more apparent, reference is made to the accompanying drawings wherein.

DETAILED DESCRIPTION OF THE EMBODIMENTS

Figure 1:
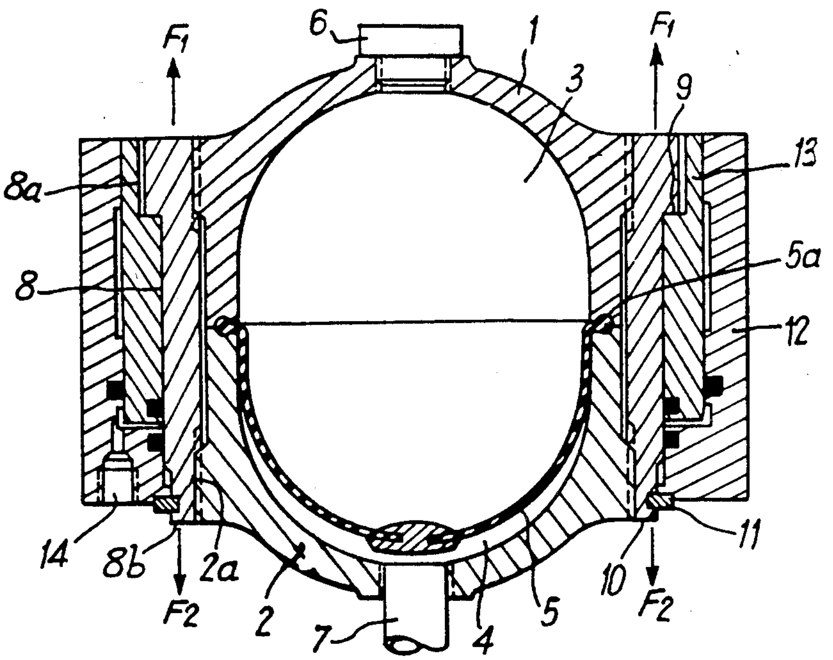
FIG. 1 is a schematic cross-sectional view of a first embodiment of the process.

Referring to FIG. 1, one sees that the accumulator is made, as is known, of two shells 1, 2 which, when assembled to each other, define an inner volume divided into two compartments 3 and 4 separated by a flexible membrane 5. The shell 1 is closed by a plug 6 and the shell 2 is connected to a hydraulic pipe 7. Through the plug 6, the volume 3 is filled with a pressurized gas; the volume 4 receives the hydraulic liquid from pipe 7. The flexible membrane 5 is provided on its edge with a bead **5*a* ensuring its fixation by being clamped between the two shells 1, 2**.

In the known devices, the two shells 1 and 2 are screwed onto each other. However, it appears that when such accumulators are subjected to high and vigorously alternated pressures, creeks appear rather quickly in the metal in the bottoms of the screw threads, which can be the cause of breakings of the connection between the two shells.

When such accumulators are tested on fatigue benches where they are subjected to alternating pressures between the atmospheric pressure and their operational maximum pressure, creeks which lead very quickly to the breaking of the accumulator appear after a short cycling period of the order of a few hundreds of thousands of cycles.

In order to avoid the formation of such creeks, the two shells 1 and 2 are, according to the process which is the object of the present invention, assembled with a prestress.

In the example shown in FIG. 1, the two shells 1 and 2 are not assembled by being screwed directly onto each other, but through the agency of a belt 8 which is subjected, before assembly, to an elongation tension by a force superior to the force generated by pressurizing the accumulator and superior to that of its maximum utilization pressure.

The belt 8 is formed with a threading **8*a* adapted for receiving the threading 1*a* of shell 1 and a threading 8*b* adapted for receiving the threading 2*a* of shell 2**.

Moreover, the belt 8 is formed with an outer shoulder 9 and a groove 10 in which is engaged a ring 11. Between the two abutments formed by the shoulder 9 and the ring 11 are placed the two elements of a hydraulic jack formed by the body of the jack such as 12, bearing against the ring 11, and an annular piston 13 bearing against shoulder 9, parts 12 and 13 being concentric with belt 8. Hydraulic accumulators are subjected to pressures on the order of thousands of pounds per square inch. Belt 8 must be capable of an elastic elongation in the axial direction, yet still be strong enough to maintain shells 1 and 2 in the proper configuration. Therefore, belt 8 is of a high strength elastic material, such as steel. Likewise, shells 1 and 2 are also of a material such as steel.

When the accumulator is to be mounted, the annular piston 13 is first positioned around belt 8, then the jack body 12 and finally the ring 11. Hydraulic liquid under pressure is then introduced between the jack body 12 and the piston 13 via opening 14, so that the belt is subjected to an effort which tends to elongate it longitudinally in the opposite directions $F_1$ and $F_2$. This elastic elongation occurs only in this direction. The diameter of belt 8 need not be expanded.

The lower shell 2 is then positioned by screwing its threading 2*a* in the inner threading 8*b* of belt 8; membrane 5 is put in place; and the shell 1 is screwed via its threading 1*a* on the other inner threading 8*a* of belt 8, until the two shells 1 and 2 come into a close fit against each other. The hydraulic pressure supplied at 14 is stopped, the ring 11 is withdrawn, followed by the jack body 12 and the piston 13.

Due to its elasticity proper, the belt 8 presses the two shells 1 and 2 against each other, the belt 8 providing a prestressed fixation.

Figure 2:
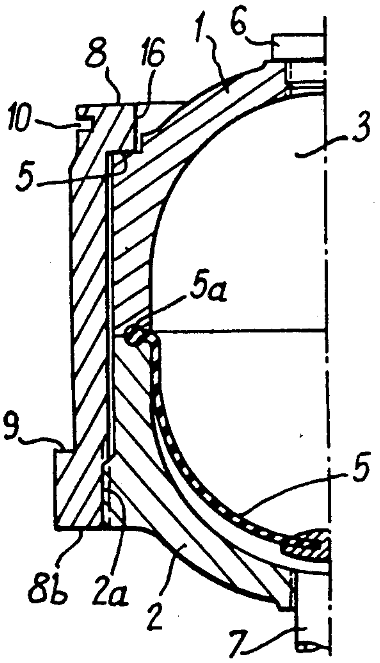
FIG. 2 is a schematic cross-sectional view illustrating an alternative embodiment different to that of FIG. 1.

In the alternative shown in FIG. 2 (where half the accumulator only is shown) the respective positions of shoulder 9 and of a groove 10, adapted for receiving the ring 11, are reversed, but their role is identical. The shell 2 alone is screwed on the belt 8, the shell 1 being simply maintained by the shoulder 15 which rests on the corresponding shoulder 16 provided inside the shell 8, instead of threading 1*a*.

In this case, the belt 8 is previously set under tension, by means of the same jack 12–13 (not shown) as that used for the device of FIG. 1; then the shell 1 is introduced from the bottom inside the belt 8 until the shoulders 15 and 16 engage each other; the membrane 5 is put in place; then the shell 2 is screwed via its threading 2*a* on the threading 8*b* of the belt until the shell 2 is in a close fit against shell 1; the pressure in jack 12–13 is released and the jack is removed as previously described.

In both cases, the two shells 1 and 2 are kept tightly pressed against each other due to the prestress created by belt 8.

Preferably, the previous extension force to which belt 8 is subjected is determined so as to be higher than the extension force to which it will be subjected when the accumulator will be subjected to the maximum pressure on the testing bench, pressure which is in turn superior to the maximum utilization pressure of the accumulator.

Figure 3:
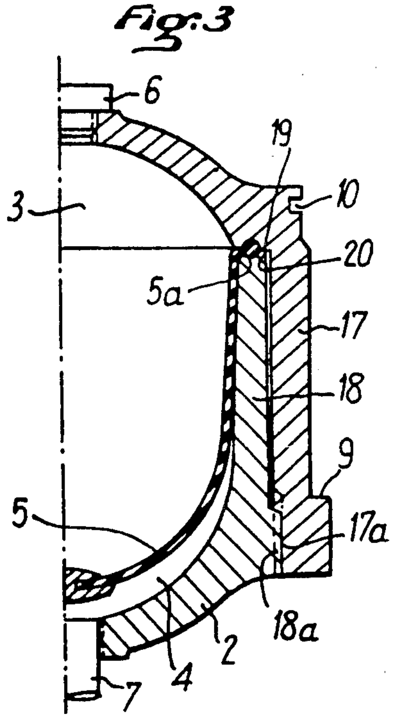
FIG. 3 is schematic cross-sectional view illustrating a second embodiment of the process.

In the example shown in FIG. 3, the belt 8 is integral with one of the shells, viz. shell 1 in the example shown.

In this example, the shell 1 is provided at its base with a skirt 17, of a length substantially equal to that of the belt 8 of FIGS. 1 and 2. Skirt 17 is provided at its base with an inner threading 17*a*. At its upper end, the skirt 17 is formed with an inner shoulder 19, provided with a groove adapted for receiving the bead 5*a* of membrane 5. Similarly, the shell 2 is provided with a skirt 18 having practically the same length as skirt 17, but of smaller diameter so as to fit into the inside of skirt 17. At its lower portion, skirt 18 is formed with a threading 18*a* adapted for being screwed into threading 17*a* and at its upper portion with a flat surface 20 which is provided for abutting against shoulder 19, and comprising also a groove for receiving bead 5*a* of membrane 5.

As is the belt 8, the skirt 17 is formed with a shoulder 9 and a groove 10 adapted for receiving the ring 22, so that the jack 12–13 (not shown) may be positioned around the skirt 17, as it is positioned around the skirt 8.

The skirt 17 is previously set under tension by the jack 12–13, in a similar way as already described with reference to FIG. 1 and 2, then the shell 2 is screwed onto shell 1 (with interposition of membrane 5) until they are in a tight fit relationship; the pressure in the jack 12–13 is then released and the jack is demounted. As with belt 8, skirts 17 and 18 are of steel, and are elongated only in the longitudinal direction.

The two shells are then maintained tightly pressed against each other, due to the prestress created in skirt 17.

With this process, an accumulator having the same capacity as a standard accumulator and subjected to the same trial pressure has withstood, without formation of creeks, 5 million cycles at the testing pressure, whereas creeks appeared in the standard accumulator after only 150,000 cycles.

It is quite obvious that the length of the element set under tension previously to the assembly (viz. the belt 8 or the skirt 17) as well as its thickness are determined as a function of the intensity of the prestress effort which is desired.

It is also obvious that the invention is not limited to the particular embodiment of the jack 12–13 providing the pre-tensioning of the belt 8 or of the skirt 17.

Figure 5:
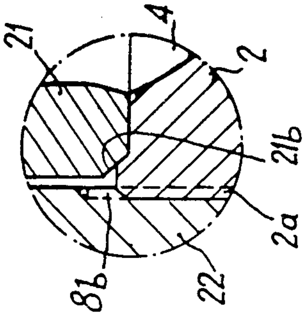
FIG. 5 is a view at a larger scale of a detail of FIG. 4.
Figure 4:
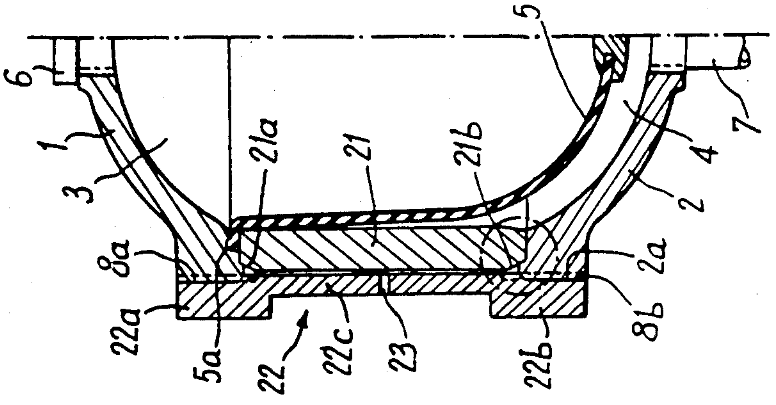
FIG. 4 is a half-sectional view of the embodiment of an accumulator provided with a wedge according to the invention.

Referring to FIG. 4 and 5, one sees that it is possible, before assembling the two shells 1 and 2, to interpose between them a cylindrical wedge 21 which, in the example shown, is a hollow cylinder of revolution, or a portion of a tube.

At its lower and upper portions, this wedge is formed with a chamfer 21*a* and 21*b* viz. two chamfers fitting into chambers of corresponding shape provided in the edges of shells 1 and 2.

The membrane 5 is provided with a bead 5*a* which engages into the groove of mating shape formed in the edge of shell 1, so that the bead is clamped between the shell 1 and the wedge 21.

The lower face of wedge 21 is bearing by being in direct contact against the edge of shell 2.

The prestressed outer belt 22 comprises, as a test-bar, a central portion 22*c* of small cross-section and two ends 22*a* and 22*b* of larger cross-section in which are provided the threadings 8*a* and 8*b*.

For assembling the accumulator thus constructed, the lower shell 2 is screwed to the base of belt 22 by means of its threading 2*a* which engages the threading 8*b* of portion 22*b*; then the wedge 21 is put in position; followed by membrane 5. The belt 22 is next set under tension, either by means of the jack described in FIG. 1 or by means of the jack described hereafter, with reference to FIG. 6. When a predetermined pre-tension value is reached, the upper shell 1 is screwed in the belt 22 by means of its threading 1*a* which engages threading 8*a*; then the tension created by the jack is released and the jack is removed. Outer bell 22, like belt 8, and skirts 17 and 18 is of a high strength yet elastic material such as steel. Further, it is elastically elongated only in the longitudinal direction.

The two shells 1 and 2 are thus tightly pressed against each other by the tension previously created inside the structure of belt 22 to which its thinned median shape confers better elasticity characteristics. The membrane 5 is maintained by its bead 5*a* which is clamped between shell 1 and wedge 21.

The hydraulic liquid under high pressure flows in via pipe 7 and lifts up membrane 5 by compressing the gas which is in enclosure 3. This hydraulic pressure and the gas pressure (which is equal) tend to separate the shells 1 and 2 and the wedge 21; but these parts remain applied against each other as long as the force created by this pressure remains lower than the pre-tension force to which the belt 22 has been subjected.

When the pressure is in excess of the predetermined maximum value, the force which tends to separate parts 1, 2 and 21 becomes superior to that tending to maintain them tightly pressed against each other and the wedge 21 moves off shell 2, so that the liquid can leak out. The higher the difference between the admitted maximum pressure and the real pressure existing at 4, the more important is the gap between wedge 21 and shell 2, and therefore the leakage flow.

Therefore, the device plays the role of a safety device preventing the deterioration of the accumulator through an over-pressure.

The liquid which flows between wedge 21 and belt 22 is discharged through one or several openings 23 extending through the latter and which, moreover, allows detecting the existence of a leakage flow.

Figure 6:
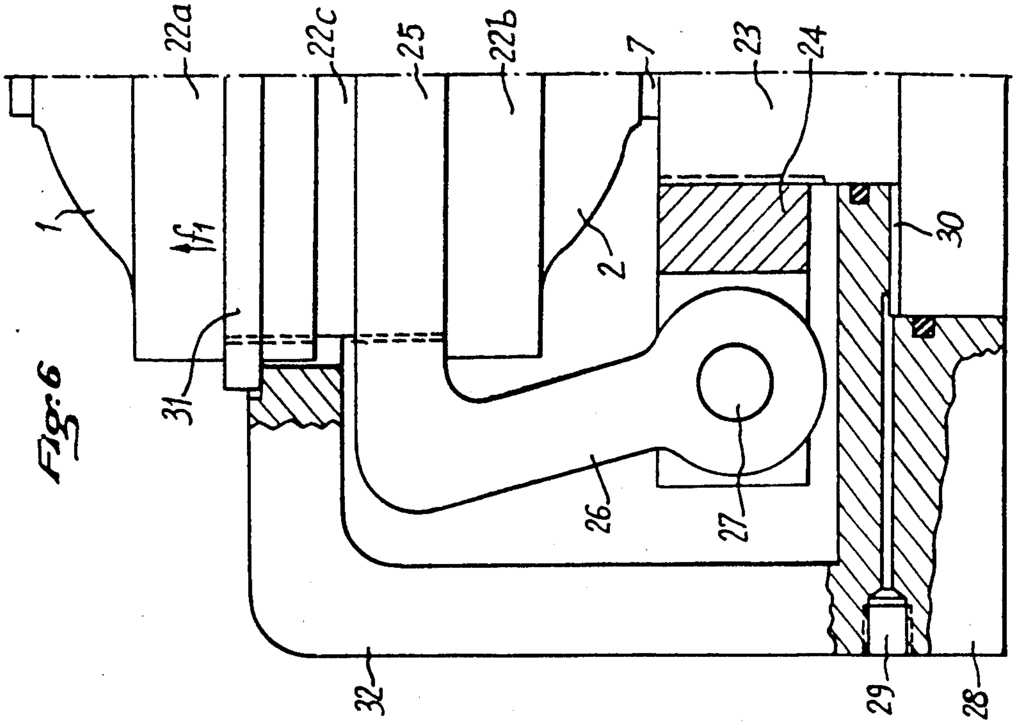
FIG. 6 shows an embodiment of a mechanism for applying the prestress to the belt shown in FIG. 4.

FIG. 6 shows the device for elongating the belt 22. On a stand 23 is screwed a crown 24 carrying to half-collars 25 through the agency of arms 26 articulated on axes 27 carried by the crown 24 (in FIG. 6 is shown only a half-collar 25, a single arm 26 and a single axis 27).

The lower portion of stand 24 forms a piston engaged into a jack body 28 formed with a channel 29 opening into a chamber 30. The jack 28 carries two half-collars 31 through the agency of the two arms 32.

For mounting the accumulator, the lower shell 2 is placed on the stand, then the wedge 21 is put in position, followed by the membrane 20 and the belt 22 is screwed to the lower shell. The two arms 26 are then folded back so that the two half-collars 25 come to bear against the shouder which separates the portions *22c* and *22b* of belt 22. The two half-collars 31 are put in position, said half-collars being formed with a shoulder which engages the ends of arms 32; the two half-collars 31 come to rest against the shoulder separating portions *22c* and *22b* of belt 22. The high pressure is admitted inside chamber 30, the effect of which is that the arms and the half-collars 31 are biased in the direction $f_1$ while the arms 22 and the half-collars 25 remain stationary: this causes an elongation of belt 22. The shell 1 is then screwed and the pressure in chamber 30 is released.

The present invention relates not only to a manufacturing process of a hydraulic accumulator, but also to the hydraulic accumulator thus obtained.

What is claimed is:

1. An oleopneumatic accumulator comprising:

a first shell having an open end forming a first chamber adapted to receive pressurized gas, and a second shell having an open end forming a second chamber adapted to receive a pressurized hydraulic fluid, a flexible membrane disposed at the open ends of said first and second chamber and forming fluid tight seals therewith;

an elastic metal annular clamping band which is pretensioned along a longitudinal axis prependicular to a diameter of the band by a predetermined amount corresponding to a hydraulic pressure applied to said second chamber at which said first and second shells separate, said band being stretchable primarily in the direction of the pretensioning along said longitudinal axis, said band diameter being oriented parrallel to said open ends;

means for affixing said clamping band to said first and second shells to overlie the edges of said open ends thereof while still retaining at least a portion of said pretension to clamp the shells together; and whereby said shells separate when hydraulic fluid pressure in excess of said predetermined amount of tension is applied to said second chamber.

2. The accumulator according to claim 1 wherein said elastic metal annular clamping band comprises a cylindrical ring having a shoulder, said ring being previously set under tension along its longitudial axis, which supports itself on one of the shells at said shoulder and is screwed in to the other.

3. The accumulator according to claim 1 wherein said two shells are each provided with a tensioned skirt being screwed one into the other and having a tensioned outer one of said skirts, said tensioned outer skirt being put under tension along its longitudinal axis prior to joining of said shells.

4. The accumulator according to claim 1 wherein said pretension is effected by means of a hydraulic jack disposed coaxially around said elastic metal annular clamping band.

5. The accumulator according to claim 2 wherein said pretension is effected by means of hydrualic jack disposed coaxially around said elastic metal annular clamping band.

6. The accumulator according to claim 3 wherein said pretension is effected by means of hydraulic jack disposed coaxially around said elastic metal annular clamping band.

7. The accumulator according to claim 1 wherein said band is comprised of steel.

8. The accumulator as set forth in claim 1, wherein said elastic metal annular clamping band is formed with at least one opening for permitting the external flow of hydraulic liquid generated by leakage of said hydraulic fluid from between said shells when said shells separate.

9. An oleopneumatic accumulator comprising a first shell having an open end forming a chamber adapted to receive pressurized gas and a second shell having an open end forming a second chamber adapted to receive a pressurized hydrualic fluid, a flexible membrane disposed at the open ends of said first and second chambers and forming fluid tight seals therewith and an elastic metal clamping band stretchable primarily in a direction parrallel to a longitudinal axis perpendicular to a diameter of said band, said diameter being oriented parrallel to said open ends, said accumulator being produced by the process comprising the steps of:

engaging opposite ends of said elastic clamping band to tension said band in said direction along the longitudinal axis perpendicular to a diameter of said band, said tension being in a predetermined amount corresponding to a hydrualic pressure applied to said second chamber at which said first and second shells separate;

affixing said elastic clamping band to said first and second shells to overlie the edges of said open ends; and disengaging said opposite ends of said affixed clamping band, said affixed clamping band retaining at least a portion of said tension to clamp the shells together, whereby said shells separate when hydraulic fluid pressure in excess of said predetermined amount of tension is applied to said second chamber.

10. The hydraulic accumulator produced in accordance with the process of claim 9 comprising upper and lower half shells separated by a cylindrical wedge and wherein said membrane is clamped between said upper shell and said wedge, whereby said wedge, said membrane and said half shells are pressed against each other by said elastic metal annular clamping band previously subjected to tension.

11. The hydraulic accumulator according to claim 9 wherein said elastic metal annular clamping band comprises an outer belt including a central portion, first and second ends and a shoulder, said first and second ends being seprated from said central portion be said shoulder, said central portion having a crosssection smaller than either of said two ends.

12. The accumulator according to claim 9 wherein said band is formed with at least one opening for permitting the external flow of hydraulic liquid generated by leakage of said hydrualic fluid from between said shells when said shells separate.

13. The accumulator according to claim 9, wherein the prior setting under the tension operation is carried out by a hydrualic jack disposed coaxially around the part which has to be set under tension.

14. The accumulator according to claim 9 wherein said band is comprised of steel.

* * * * *